United States Patent Office 3,547,558
Patented Dec. 15, 1970

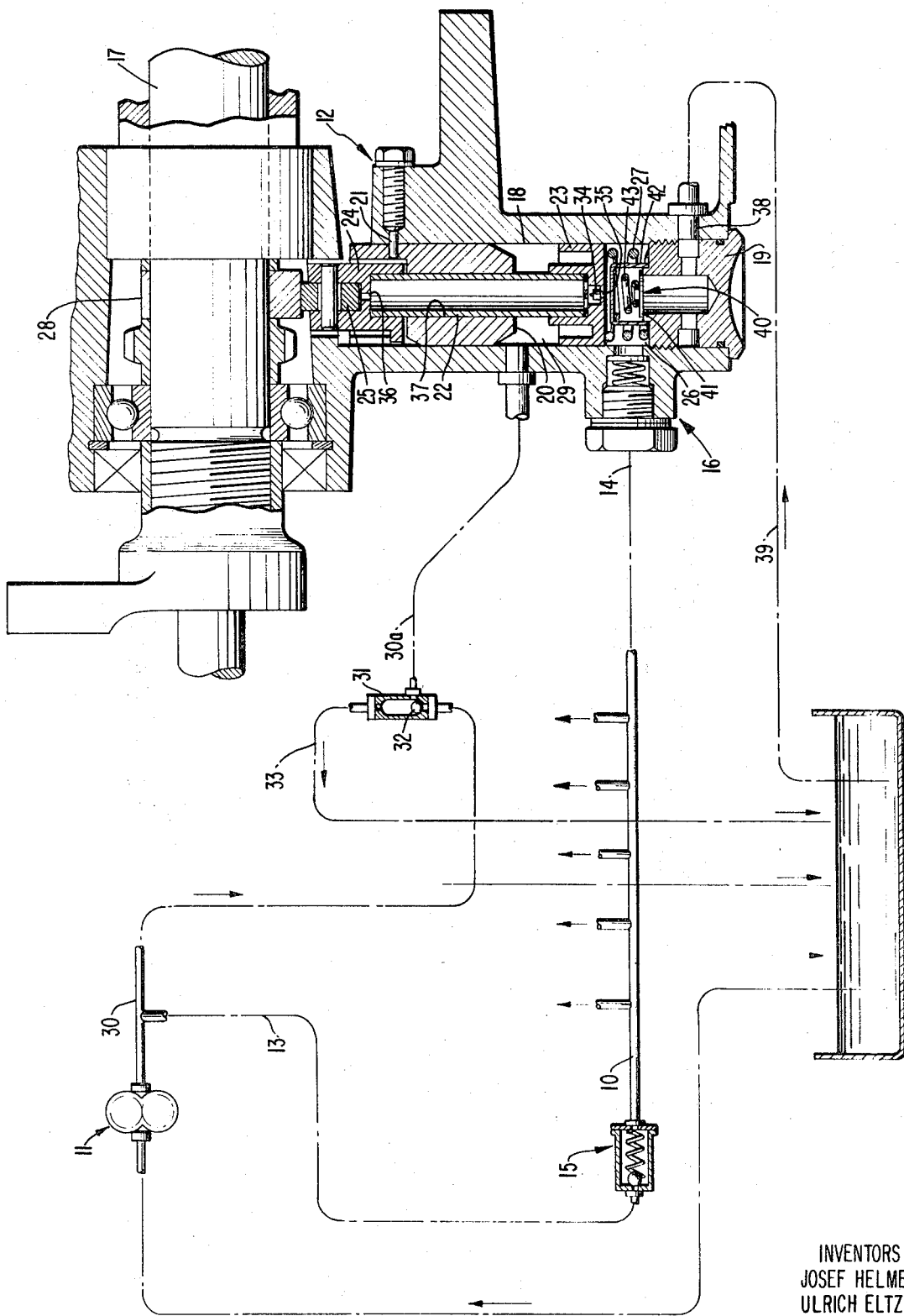

3,547,558
INSTALLATION FOR THE PRESSURE MEDIUM SUPPLY OF AN AUTOMATIC MOTOR VEHICLE TRANSMISSION
Josef Helmer, Aich, Kreis Nurtingen, and Ulrich Eltze, Esslingen-Serach, Germany, assignors to Daimler-Benz Aktiengesellschaft, Stuttgart-Unterturkheim, Germany
Filed May 31, 1968, Ser. No. 733,361
Claims priority, application Germany, June 2, 1967, 1,630,295
Int. Cl. F04b *15/00, 23/04, 49/00*
U.S. Cl. 417—199        29 Claims

ABSTRACT OF THE DISCLOSURE

An installation for the pressure medium supply of an automatic motor vehicle change-speed transmission controlled by a pressure medium, which includes a primary pump driven by the engine and a second pump driven by the output shaft of the transmission, both supplying pressure medium to the common pressure medium circulation by way of check valves, and in which the secondary pump is disconnected from the transmission output shaft in dependence on the output pressure at the primary pump.

BACKGROUND OF THE INVENTION

The present invention relates to an installation for the pressure medium supply of a motor vehicle change-speed transmission automatically controlled by a pressure meduim whereby a primary pump is associated with the driving engine and a second pump is associated with the transmission output shaft which feed both into a common pressure medium circulatory system by way of check valves.

Automatic motor vehicle transmissions which are controlled in the aforementioned manner by a pressure medium, are known, per se, in the prior art. Undesirable therewith are the expenditures in connection with the two pumps which use unnecessary power during the operation. Hence, in more recent times, one has gone over more and more to operate only with one pump, namely, with the primary pump. This, however, in turn, entails again the disadvantage that with a standing engine a pressure medium supply never occurs and therefore the vehicle cannot be towed for starting the engine. Furthermore, a longer towing of the vehicle with a standing engine is not possible because the transmission then receives no lubrication.

SUMMARY OF THE INVENTION

The present invention aims at avoiding the aforementioned disadvantages. It solves the underlying problems with the installations mentioned above in that the secondary pump is adapted to be disconnected from the transmission output shaft in dependence on the pressure build-up at the primary pump. The construction according to the present invention offers the advantage that at first no unnecessary power is consumed since with a running engine and with a supplying primary pump, the secondary pump is turned off and does not idle along at all. If, however, the engine comes to a standstill, then the secondary pump is automatically engaged and takes over the pressure medium supply. Consequently, the vehicle can be both started by towing and can be towed over longer distances.

With a preferred construction according to the present invention, the secondary pump is constructed as a piston pump whose working piston is either kept by means of a roller in abutment at an eccentric of the drive shaft by spring force or is lifted off from this eccentric by pressure on the backside thereof against the spring force. A further feature of the present invention consists in that the space on the backside of the working piston of the secondary pump is connected by way of a line with the pressure side of the primary pump and in that a valve is arranged in this line which either opens this line under the pressure of the primary pump or relieves the line section leading to the secondary pump into the discharge by the action of a spring or by gravitational forces with an absent pressure of the primary pump.

With one type of construction according to the present invention, a housing bore accommodating the secondary pump is sealingly closed on its side facing the output shaft by means of a plug and a piston rod extends through this plug which carries at its end facing the output shaft the roller with its carrier and at the opposite end the working piston of the secondary pump. It is thereby particularly appropriate if, according to a further feature of the present invention, the piston rod is constructed as a pipe and thereby simultaneously serves for the lubrication of the roller effectively only during the operation of the secondary pump as well as for the relief of the pump working space. It is achieved in this manner that with a turned-off or disengaged secondary pump, no oil pressure can build up in the working space but that, on the other hand the lubrication starts automatically at once when the secondary pump begins to operate.

For the lubrication, the present invention prefers a construction according to which the working piston is provided with a small aperture between its working face and the interior of the piston rod which is closed during the suction stroke by a ball valve or the like and which is opened during the working stroke. Appropriately, the carrier for the roller is then constructed fork-shaped and a lubricating oil bore terminating in the interior of the piston rod is present in the fork bottom.

It is further proposed by the present invention that a housing bore accommodating the secondary pump is closed at its end opposite the output shaft by a closure plug which forms simultaneously the suction line connection and accommodates the suction valve. A space-saving arrangement results in this manner.

In particular, it is proposed in connection therewith by the present invention that the suction valve is constructed as disk valve and is arranged in the pump working space itself, and that the closure plug forms the valve seat. According to a further feature of the present invention, the valve seat for the suction valve is then arranged at an annular collar or flange over which extends a permeable metal basket against the bottom of which is supported the valve spring. However, it is also feasible within the scope of the present invention to omit this valve basket and to support the valve spring directly at the working piston whereby corresponding guide means would then have to be provided. A coil spring is arranged concentrically about the suction valve within the pump working space which presses the working piston in the direction toward the output shaft. The stress of this spring produces the suction stroke during the operation of the secondary pump.

Accordingly, it is an object of the present invention to provide an installation for the pressure medium supply of an automatic motor vehicle change-speed transmission which avoids by simple means the aforementioned shortcomings and drawbacks encountered in the prior art.

Another object of the present invention resides in an installation for the pressure medium supply of an automatic transmission utilizing a primary and secondary pump which eliminates the unnecessary power dissipation of the secondary pump driving normal operation of the engine.

A further object of the present invention resides in an installation for the pressure medium supply of an automatic transmission in which the pump load is decreased during normal operation of the engine, yet permits starting of the engine by towing of the vehicle as well as towing of the vehicle over longer distances.

Still another object of the present invention resides in a pressure medium supply installation for automatic transmissions in which the secondary pump is effectively disengaged when the primary pump operates properly to reduce the pump load.

These and further objects, features and advantages of the present invention will become more obvious from the following description when taken in connection with the accompanying drawing, which shows, for purposes of illustration only, one embodiment in accordance with the present invention, and wherein:

The single figure is a schematic view of a pressure medium supply system in accordance with the present invention, illustrating the secondary pump, on an enlarged scale, in cross section.

Referring now to the single figure of the drawing, reference numeral 10 designates therein the pressure medium circulatory system of a conventional automatic motor vehicle change-speed transmission (not shown); the transmission as well as its circulatory system 10 may be of any conventional construction while the actuating elements for the transmission members and the regulating and control devices thereof constitute loads of the system in the customary manner. The pressure medium circulatory system 10 is supplied with pressure medium by a conventional primary pump generally designated by reference numeral 11 and by a secondary pump generally designated by reference numeral 12. Both pumps 11 and 12 are connected with the circulatory system 10 by means of pressure lines 13 and 14 by way of check valves generally designated by reference numerals 15 and 16. The pressure valve of the pump itself serves as check valve on the side of the secondary pump 12. The primary pump 11 is driven in a conventional manner by the driving engine (not shown). The drive of the secondary pump takes place also in a conventional manner from the transmission output shaft 17.

The secondary pump 12 is constructed as piston pump which is connected with its drive—namely, with the transmission output shaft 17—not positively but by spring force. The pump 12 is arranged in a bore 18 of the housing. The bore 18 is closed at its end opposite the transmission output shaft 17 by a closure plug 19. This plug 19 accommodates the suction line of the pump and the suction valve in a manner to be described more fully hereinafter.

The housing bore 18 is sealingly closed at its end facing the transmission output shaft 17 by a plug 20. This plug 20 is fixed in its position by a threaded pin 21. The piston rod 22 extends through the plug 20 and connects the working piston 23 of the pump with a carrier 24 for the roller 25. A spring 27 is arranged in the working space 26 of the pump between the closure plug 19 and the working piston 23, which presses the working piston 23 with the roller 25 continuously against an eccentric 28 that is secured on the transmission output shaft 17. As long as the output shaft 17 rotates, the secondary pump 12 also rotates whereby the suction stroke is produced by the spring 27 and the pressure stroke by the eccentric 28.

It can already be seen from the preceding description that the connection between the working piston 23 and the eccentric 28 on the output shaft 17 is not a positive connection. Instead, this connection is established exclusively by the spring 27, i.e., therefore force-lockingly. Consequently, when the spring effect is eliminated, the pump can be uncoupled or disconnected, so to speak of, from its drive.

For this purpose, the space 29 on the backside of the working piston 23 is connected by way of a line 30 with the pressure side of the primary pump 11. A valve 31 is so arranged in this line 30 that normally its closure body, i.e., in this case, the ball 32, is held in such a position by gravitational force or by a spring force that the line section 30a—which leads to the space 29 in the secondary pump 12—is relieved toward the discharge by way of the line 33. In this position, the secondary pump therefore operates in the described manner and assumes the supply of the pressure medium circulatory system 10.

However, as long as the primary pump 11 operates—and this will normally be the case always as long as the engine runs—the valve 31 is shifted into its other position by the pressure in the line 30. The pump pressure of the primary pump 11 now builds up by way of the connecting lines 30 and 30a in the space 29 on the backside of the working piston 23 of the secondary pump 12. As a result thereof, the force of the spring 27 is effectively eliminated and the working piston 23 is always held fast in its illustrated lower position. The connection of the roller 25 with the eccentric 28 is therefore separated in this manner, i.e., the secondary pump no longer operates.

During normal operation of the vehicle, the last-described action will be the normal condition. If, for any reason, the engine should stall or should not be capable of being started again, then any pressure build up in the space 29 is also missing and the secondary pump 12 can then operate in the manner described at first. The vehicle can be started in this condition by towing or can be towed away.

It is necessary for lifting off the piston rod 22 from the eccentric 28 that the oil present in the working space 26, and possibly also leakage oil flowing into the same, is permitted to flow off into the sump by way of a small throttle bore in order that the piston can reach its lower end position. This oil loss, i.e., leakage oil necessarily resulting therefrom during the operation of the secondary pump is utilized by the arrangement according to the present invention for the lubrication of the eccentric 28 and of the roller 25. For this purpose, the piston rod 22 is constructed hollow. A ball valve or check valve 34 is arranged in the bottom of the operating piston 23 which closes a small bore 35 to the working space 26 of the pump. A similarly small bore 36 is present in the carrier 24 for the roller 25. During the operation of the pump, the check valve 34 is now lifted during each pressure stroke and a slight quantity of oil leaks upwardly through the bores 35 and 36 so that the drive roller 25 and its bearing are lubricated.

A cross bore 37 is arranged in the tubular piston rod 22 through which the sliding guidance of the piston rod 22 in the closure plug 20 is lubricated.

The closure plug 19 accommodates the connection 38 for the suction line 39 as well as the suction valve generally designated by reference numeral 40 which is constructed as disk valve and is arranged within the working space 26. An annular collar 41 forms the valve seat. A permeable basket 42 is secured on this annular collar 41; the valve spring 43 is supported against the bottom of the basket 42 while the basket 42 simultaneously forms a guidance for the closure body of the valve. The spring 27 is arranged concentrically about the annular collar 41.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications.

We claim:

1. An installation for the pressure medium supply of a pressure-medium-controlled automatic motor vehicle change-speed transmission in which a primary pump is drivingly connected to the driving engine and a secondary pump is drivingly connected to the transmission output shaft, and in which both pumps supply pressure medium to the pressure medium circulatory system by way of check valves or the like, wherein the improvement comprises means operatively associated with the secondary pump for disconnecting the drive of the secondary pump from the transmission output shaft in dependence on the output pressure of the primary pump.

2. An installation according to claim 1, wherein the secondary pump is constructed as piston pump means having a working piston, an eccentric at the transmission output shaft, and said working piston being either held with roller means in abutment at said eccentric by a spring force or being lifted off from said eccentric by a pressure on the backside of the working piston acting opposite the spring force.

3. An installation according to claim 2, wherein the space on the backside of the working piston of the secondary pump is connected with the pressure side of the primary pump by way of a connecting line, valve means in said connecting line which is operable to either open this line under the pressure of the primary pump or to relieve the line section leading to the secondary pump into the discharge in the absence of a predetermined pressure at the primary pump.

4. An installation according to claim 3, wherein said valve means is spring-actuated.

5. An installation according to claim 3, wherein said valve means is gravity-actuated.

6. An installation according to claim 3, further comprising housing means provided with a housing bore accommodating the secondary pump, plug means sealingly closing said housing bore on the side thereof facing the transmission output shaft, the working piston being provided with a piston rod extending through said plug means, and said piston rod carrying said roller means at the end thereof facing the output shaft and, at the opposite end, carrying the working piston.

7. An installation according to claim 6, further comprising carrier means at the end of the working piston for carrying said roller means.

8. An installation according to claim 6, wherein said piston rod is constructed as hollow pipe and thereby serves simultaneously for the lubrication of the roller means effective during the operation of the secondary pump and for the relief of the pump working space.

9. An installation according to claim 8, wherein said working piston is provided with a small aperture between its working face and the interior of the piston rod which is closed during the suction stroke by a valve means and is open during the working stroke.

10. An installation according to claim 9, wherein the carrier means for the roller means is constructed fork-shaped and is provided in its fork bottom with a lubricating oil bore terminating on the inside of the piston rod.

11. An installation according to claim 10, further comprising closure plug means for closing said housing bore at the end opposite the output shaft, said closure plug means forming simultaneously the suction line connection and accommodating a suction valve means.

12. An installation according to claim 11, wherein the suction valve means is constructed as plate valve and is arranged in the pump working space, and wherein said closure plug means forms the valve seat.

13. An installation according to claim 12, wherein the valve seat for the suction valve means is arranged at an annular collar, a permeable metal basket extending over said collar, and a valve spring resting against the bottom of said metal basket.

14. An installation according to claim 13, further comprising coil spring means arranged concentrically about the suction valve means within the pump working space, said coil spring means seeking to displace the working piston in the direction toward the output shaft.

15. An installation according to claim 1, wherein the secondary pump is constructed as piston pump means having a working piston, said working piston being either held in operative engagement with the output shaft by an elastic force or being effectively disconnected from said output shaft by a force on the backside of the working piston acting in opposition to the elastic force.

16. An installation according to claim 15, wherein the space on the backside of the working piston of the secondary pump is connected with the pressure side of the primary pump by way of a line, and valve means in said line to provide a connection with the primary pump in the presence of pressure at the primary pump or to connect the line section leading from the valve means to the secondary pump with discharge in the absence of a predetermined pressure at the primary pump.

17. An installation according to claim 16, wherein said valve means is spring-actuated.

18. An installation according to claim 16, wherein said valve means is gravity-actuated.

19. An installation according to claim 16, further comprising housing means provided with a housing bore accommodating the secondary pump, plug means sealingly closing said housing bore on the side thereof facing the transmisson output shaft, the working piston being provided with a piston rod extending through said plug means, and said piston rod at its end facing the output shaft being operatively connected with the latter and at the opposite end carrying the working piston.

20. An installation according to claim 2, further comprising housing means provided with a housing bore accommodating the secondary pump, plug means sealingly closing said housing bore on the side thereof facing the transmission output shaft, the working piston being provided with a piston rod extending through said plug means, and said piston rod carrying at its end facing the output shaft, the roller means by way of carrier means and at the opposite end the working piston.

21. An installation according to claim 20, wherein said piston rod is constructed as hollow pipe and thereby serves simultaneously for the lubrication of the roller means effective during the operation of the secondary pump and for the relief of the pump working space.

22. An installation according to claim 21, wherein said working piston is provided with a small aperture between its working face and the interior of the piston rod which is closed during the suction stroke by a valve means and is open during the working stroke.

23. An installation according to claim 22, wherein the carrier means for the roller means is constructed fork-shaped and is provided in its fork bottom with a lubricating oil bore terminating on the inside of the piston rod.

24. An installation according to claim 1, further comprising housing means provided with a housing bore, closure plug means for closing said housing bore at the end opposite the transmission output shaft, said closure plug means simultaneously forming a suction line connection and accommodating a suction valve means.

25. An installation according to claim 24, wherein the suction valve means is constructed as plate valve and is arranged in the pump working space, and wherein said closure plug means forms a valve seat.

26. An installation according to claim 25, wherein the valve seat for the suction valve means is arranged at an annular collar, and further including a permeable metal basket extending over said collar, and a valve spring resting against the bottom of said metal basket.

27. An installation according to claim 26, further comprising coil spring means arranged concentrically about the suction valve means within the pump working space, said coil spring means seeking to displace the working piston of said pump in the direction toward the transmission output shaft.

28. An installation according to claim 24, further comprising coil spring means arranged concentrically about the suction valve means within the pump working space, said coil spring means seeking to displace the working piston in the direction toward the output shaft.

29. An installation according to claim 15, further comprising housing means provided with a housing bore accommodating the secondary pump, plug means sealingly closing said housing bore on the side thereof facing the transmission output shaft, the working piston being provided with a piston rod extending through said plug means, and said piston rod at its end facing the output shaft being operatively connected with the latter and at the opposite end carrying the working piston.

References Cited

UNITED STATES PATENTS

| | | | |
|---|---|---|---|
| 2,665,637 | 1/1954 | Lauck | 103—4 |
| 2,700,873 | 2/1955 | Carlson | 103—4X |
| 2,761,388 | 9/1956 | Peterson | 103—4X |
| 2,812,715 | 11/1957 | Redding et al. | 103—4X |
| 2,910,942 | 11/1959 | Thorman | 103—4 |
| 3,070,020 | 12/1962 | Pierce | 103—120(PA)UX |
| 3,101,058 | 8/1963 | Carr, Jr. et al. | 103—21X |
| 3,120,763 | 2/1964 | Shuster | 74—(HCSI)UX |
| 3,286,636 | 11/1966 | Schaub | 103—21X |

WILLIAM L. FREEH, Primary Examiner

W. J. KRAUSS, Assistant Examiner

U.S. Cl. X.R.

74—472; 103—11